US010033965B1

(12) United States Patent
Clements et al.

(10) Patent No.: US 10,033,965 B1
(45) Date of Patent: Jul. 24, 2018

(54) OVERT AND COVERT CAPTURE OF IMAGES OF CONTROLLED-ENVIRONMENT FACILITY RESIDENTS USING INTELLIGENT CONTROLLED-ENVIRONMENT FACILITY RESIDENT COMMUNICATIONS AND/OR MEDIA DEVICES

(71) Applicant: Securus Technologies, Inc., Dallas, TX (US)

(72) Inventors: Alice J. Clements, Coppell, TX (US); Matthew Smith, McKinney, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 15/468,098

(22) Filed: Mar. 23, 2017

(51) Int. Cl.
H04N 7/15 (2006.01)
H04N 7/14 (2006.01)
G06K 9/00 (2006.01)
H04N 21/4415 (2011.01)

(52) U.S. Cl.
CPC ......... H04N 7/147 (2013.01); G06K 9/00255 (2013.01); G06K 9/00288 (2013.01); H04N 21/4415 (2013.01)

(58) Field of Classification Search
CPC ..... G06F 21/31; G06F 21/32; G06K 9/00255; G06K 9/00288; G06Q 10/02; G06Q 30/0645; H04L 63/08; H04N 1/2112; H04N 5/2251; H04N 5/23222; H04N 5/272

USPC .......... 348/14.01, 14.02, 14.03, 14.1, 14.14, 348/14.15
See application file for complete search history.

(56) References Cited

U.S. PATENT DOCUMENTS

| | | | | |
|---|---|---|---|---|
| 9,030,292 | B2* | 5/2015 | Torgersrud | G06F 21/32 340/5.53 |
| 9,472,071 | B1* | 10/2016 | Passe | G08B 13/19636 |
| 2002/0057915 | A1* | 5/2002 | Mann | E03C 1/057 396/661 |
| 2003/0137426 | A1* | 7/2003 | Anthony | B60R 25/102 340/574 |
| 2006/0279631 | A1* | 12/2006 | Badalian | G08B 13/19619 348/148 |
| 2011/0273604 | A1* | 11/2011 | Tabata | H04N 5/272 348/333.01 |
| 2012/0262271 | A1* | 10/2012 | Torgersrud | G06F 21/32 340/5.53 |
| 2013/0263227 | A1* | 10/2013 | Gongaware | H04L 63/08 726/4 |
| 2015/0358498 | A1* | 12/2015 | Eom | H04N 1/2112 348/231.99 |
| 2016/0057138 | A1* | 2/2016 | Hoyos | G06T 7/73 726/7 |

(Continued)

Primary Examiner — Binh Kien Tieu
(74) Attorney, Agent, or Firm — Fogarty LLP (57) ABSTRACT

A controlled-environment facility resident communication and/or media device enables a controlled-environment facility resident to carry-out one task on the device, and provides a visual indication, to the resident, that an overt image and/or video is being captured during this task. Conversely, a covert image and/or video of a user is captured while the controlled-environment facility resident communication and/or media device is in use for another task, without providing the user the same or other visual indication that the covert image is being captured.

24 Claims, 6 Drawing Sheets

(56) References Cited

U.S. PATENT DOCUMENTS

| | | | |
|---|---|---|---|
| 2016/0078281 A1* | 3/2016 | Gongaware | H04L 63/08 382/118 |
| 2016/0247341 A1* | 8/2016 | Talwerdi | B42D 9/04 |
| 2017/0155831 A1* | 6/2017 | Jang | G06K 9/00228 |
| 2017/0206475 A1* | 7/2017 | Shoen | G06Q 30/0645 |

* cited by examiner

OVERT AND COVERT CAPTURE OF IMAGES OF CONTROLLED-ENVIRONMENT FACILITY RESIDENTS USING INTELLIGENT CONTROLLED-ENVIRONMENT FACILITY RESIDENT COMMUNICATIONS AND/OR MEDIA DEVICES

TECHNICAL FIELD

This specification relates generally to controlled-environment facilities, and, more particularly, to systems and methods for overtly and covertly capturing images, including video of controlled-environment facility residents by intelligent controlled-environment facility resident communications and/or media devices, during use of such devices, such as, in specific embodiments and implementations, during entry of credentials, or the like, on such devices.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including videoconferences and online chat sessions.

To enable these various types of communications, a jail or prison may install or otherwise deploy communication and/or media access devices in different parts of the facility. Such communication and/or media access devices are generally used to enable inmate communications, but may also be used for other purposes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide a controlled-environment facility resident communication and/or media device that enables a controlled-environment facility resident to carry-out a task on the device. This controlled-environment facility resident communication and/or media device may be a video visitation device, a personal resident communication and/or media device, or the like. The device also provides a visual indication, to the resident, that an overt image and/or video is being captured during this task. Since notice is given that this image is being captured, it is referred to herein as an "overtly" or "openly" captured image or video, and may be used as a reference image or video, record image or video, archive image or video, or the like. Consistent with the forgoing, this task may be creation of an account and may include creation and/or acceptance of account login credentials, or the like, and association of the overt image with the account and/or login credentials, etc.

A covert image and/or video of a user is captured while the controlled-environment facility resident communication and/or media device is in use for another task, after or before the aforementioned task, without providing the user the same or other visual indication that the covert image is being captured. This other task may be entering of the aforementioned credentials and the device may associate, or facilitate association of, the covert image and/or video with the credentials entered. Additionally or alternatively, the other task may comprise some sort of acknowledgement by the user. In some implementations, such as where the other task is a login, the covert image and/or video may additionally, or only, be captured as a result of a predetermined number of failed login attempts.

Digital facial recognition may be applied in some implementations to compare the covert image of the user to the overt image of the resident, to confirm that the user is the resident. Conversely, or in furtherance of such recognition, the controlled-environment facility resident communication and/or media device may detect whether a face is present in a field of view of a camera of the device, prior to capturing the covert image and/or video with the camera. Further in such regard, the device may prohibit entry of credentials and/or refuse acceptance of an acknowledgement, or the like, in response to a failure to detect whether a face is present in the field of view of the camera of the device. The device may continue to prohibit entry of credentials and/or refuse acceptance of an acknowledgement, or the like until a face is present in the field of view of the camera of the device.

In various implementations, the tasks may be, or may include, creation of a resident electronic communications account and the other task may be sending an electronic communication using the electronic communications account. In such implementations, the overt image of the resident may be employed in the electronic communication, and the resident may be enabled to supplement the overt image in the electronic communication.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

Correctional facilities present numerous difficulties in areas such as security, surveillance, financial transactions, communications, visitation, investigation, budgetary, etc.; which in turn make technological implementations uniquely challenging in those environments. In many cases, technologies that are used outside of correctional facilities are not immediately applicable to the correctional environment without significant changes and modifications. Moreover, correctional facilities may have specific needs that are not particularly relevant outside of those environments. As such, some of the systems and methods described herein may be specifically tailored to address one or more of the aforementioned needs and challenges.

This specification relates generally to controlled-environment facilities, disclosing systems and methods for covertly capturing images of controlled-environment facility residents by intelligent controlled-environment facility resident communications and/or media devices, during use of such devices. Specific embodiments and implementations of the present systems and methods disclosed herein, may capture images of controlled-environment facility residents during entry of credentials, or the like, on such intelligent controlled-environment facility resident communications and/or media devices. That is, an imaging device that may be a part of a controlled-environment facility resident communication and/or media device disposed within the controlled-environment facility may be used to capture an image or video of the resident. Such an intelligent controlled-environment facility resident communication and media device may be an Intelligent Facility Device (IFD) (e.g. a video phone particularly adapted for use in a controlled-environment facility) or an Intelligent Resident Device (IRD) (e.g. a personal wireless device, such as a tablet computing device or smartphone, which may be adapted and/or approved for use in controlled-environment facility), described in greater detail below. Regardless, IFDs, IRDs, or the like, may be generally referred to herein as controlled-environment facility resident communication and/or media devices, or the like, in that they are devices that residents of a controlled-environment facility may use for communication, such as with non-residents, for accessing media, and/or the like. In order to perform such tasks, and/or while performing such tasks, on an intelligent facility communication and/or media device the resident may be required to login or otherwise provide identification credentials, via the device. In accordance with various embodiments of the present systems and methods, it is at this time that a covert image may be captured, in the manner and for the purposes described in greater detail below.

In accordance with such embodiments of the present systems and methods, a controlled-environment facility resident communication and/or media device may enable a controlled-environment facility resident to carry-out tasks on the device, and provides a visual indication, to the resident, that an overt image and/or video is being captured during one such task. Conversely, a covert image and/or video of a user is captured while the controlled-environment facility resident communication and/or media device is in use for another task, after or before the aforementioned "one" task, without providing the user the same or other visual indication that the covert image is being captured.

Hence, in accordance with embodiments of the present systems and methods, pictures (or video) of controlled-environment facility residents may be taken with resident-facing terminals, such as an IFD or IRD. For example, a picture of a controlled-environment facility resident may be taken when the resident creates an account (login) using such an intelligent controlled-environment facility resident communications and/or media device. This image or video capture is, in accordance with various embodiments of the present systems and methods, fully disclosed to the resident. For example, a user interface may inform the resident where to place their face for the image capture and the resident may be afforded an opportunity to retake the picture if he or she so desires.

However, also in accordance with embodiments of the present systems and methods, a resident's image and/or video of the resident, may be captured by the resident-facing device at other times, such as randomly during a task, or otherwise, without notifying the resident, and hence in a covert manner. For example, the resident's image may be captured when the resident is entering credentials to acknowledge various facility terms and conditions, or the like, without notifying the resident, as a way to confirm the identity of the resident, or at least as a way to (further) document the resident's acceptance of such terms and conditions. In accordance with such embodiments facial recognition may be used to confirm the identity of the resident, or to at least confirm a face is present to take an image of.

Regardless, when a resident is informed a photo or video is being taken, such as during the aforementioned creation of an account (login), a light may be used to indicate the photo is being taken, and/or a light may be used to light the resident's face for the photo or video. However, when an image or video is being captured without notifying the resident, no light is illuminated, facilitating covertly taking this photo or video Hence in a further example, if a correctional facility wants an inmate to acknowledge that he has read the facility's Inmate Handbook, watched the Prison Rape Elimination Act (PREA) video, or the like, the resident may be required to enter his or her credentials on the resident facing device, after the resident viewed the material on the device. Whereupon, in accordance with embodiments of the present systems and methods, the resident-facing device may take the inmate's photo at that time, not turning on the light, so the inmate will not know a picture is being taken.

Figure 1:
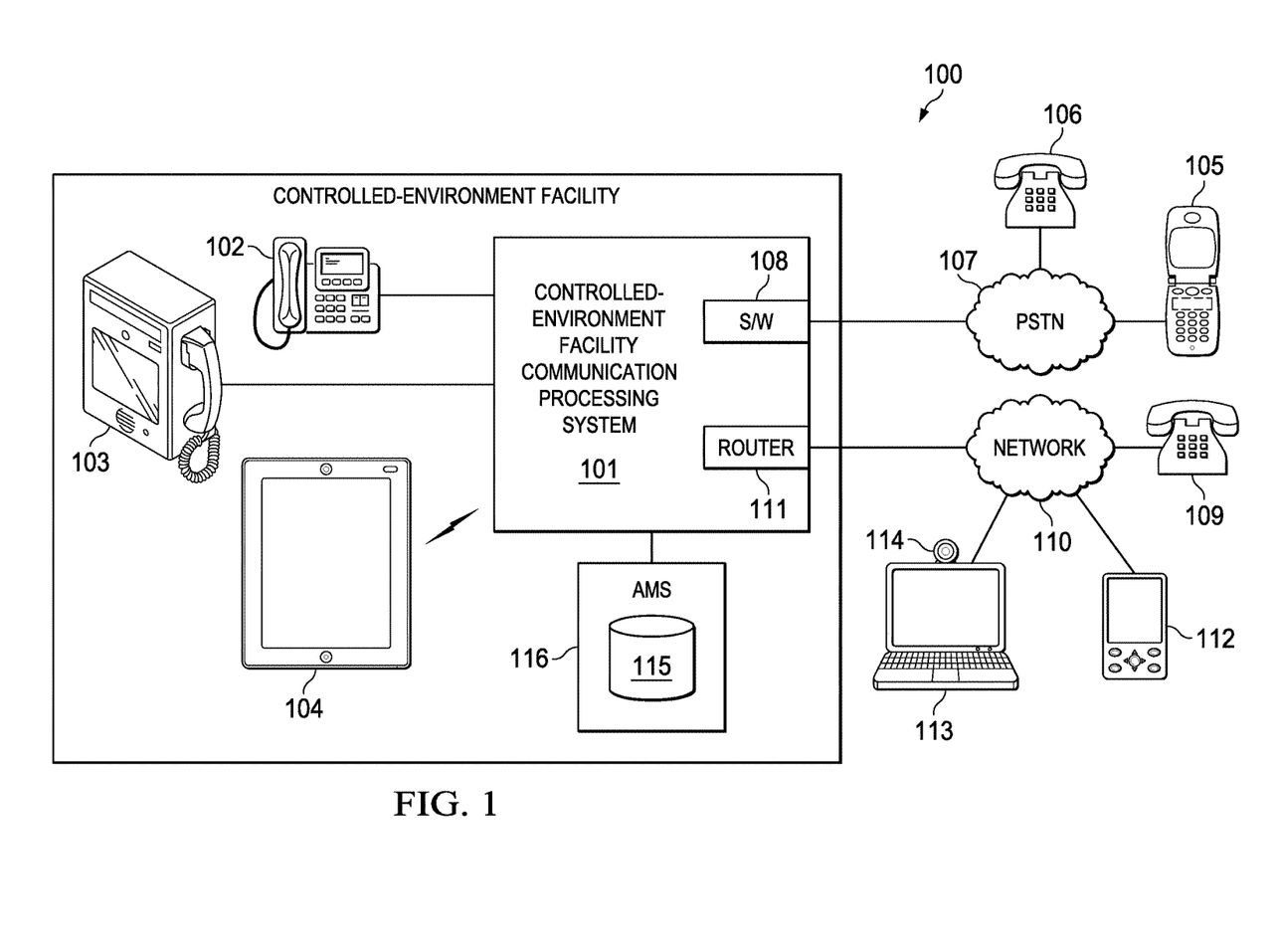
FIG. 1 is a block diagram of an example of an environment where intelligent controlled-environment facility resident communications and/or media devices may be deployed, according to some embodiments of the present systems and methods.

Turning now to FIG. 1, a block diagram of illustrative environment 100 where intelligent controlled-environment facility resident communications and/or media devices may be deployed, according to some embodiments of the present systems and methods. As shown, communication processing system 101 may provide telephone services, videoconferencing, online chat, and other communication services to a controlled-environment facility. For example, in some cases, communication system 101 may be co-located with a controlled-environment facility. Alternatively, communication system 101 may be centrally or remotely located with respect to one or more controlled-environment facilities and/or may provide communication services to multiple controlled-environment facilities. More generally, however, it should be noted that communication system 101 may assume a variety of forms, and may be configured to serve a variety of facilities and/or users, whether within or outside of a controlled-environment facility.

In the context of a correctional facility, for instance, inmates may use telephones 102 to access certain communication services. In some facilities, inmates may also use a video visitation device 103 or a personal computer wireless device, such as a tablet computing device or smartphone 104 adapted or approved for use in the controlled-environment facility to access such services. For example, an inmate may initiate telephone services by lifting the receiver on telephone 102, at which time the inmate may be prompted to provide a personal identification number (PIN), other identifying information or biometrics. An interactive voice response (IVR) unit (not shown) may generate and play prompt or other messages to inmates on devices 102, 103 and/or 104.

Intelligent controlled-environment facility resident communication and media devices employed in accordance with the present systems and methods may include a video visitation device 103, referred to above and herein as an IFD (e.g. a video phone particularly adapted for use in a controlled-environment facility) or personal computer wireless device 104, referred to above and herein as an IRD (e.g. a personal wireless device, such as a tablet computing device or smartphone, which may be adapted and/or approved for use in controlled-environment facility), described in greater detail below. Such an IRD may be referred to as an Intelligent Inmate Device (ID) in a correctional institution environment, and/or an IRD, or the like, in controlled-environment facilities, in general. Regardless, as noted, IFDs, IIDs, IRDs, etc. may be generally referred to herein as controlled-environment facility resident communication and/or media devices, or the like, in that they are devices that residents of a controlled-environment facility may use for communication, such as with non-residents, and/or for accessing media.

Under control of communication processing system 101, devices 102 through 104 may be capable of connecting to a non-resident's (i.e., a person not committed to a controlled-environment facility) telephone 106 or device 105 across a publicly switched telephone network (PSTN) 107. For example, telephone 106 may be located at a non-resident's home, inmate visitation center, etc. Switch 108 in communication processing system 101 may be used to connect calls across PSTN 107. Additionally or alternatively, the non-resident may be at telephone 109 or device 112, which is on an Integrated Services Digital Network (ISDN), Voice-over-IP (VoIP), or packet data network 110, such as, for example the Internet. Router 111 of communication system 101 is used to route data packets associated with a call connection to destination telephone 109.

Video visitation devices 103 (also referred to as "IFD 103") are communication devices with video conferencing and/or multimedia capabilities to enable inmates to participate in voice calls, video visitation sessions with non-residents of the correctional facility, secure online chat, Internet access, email access, (restricted) social media access, etc. For example, a non-resident party may have a personal or laptop computer 113 with camera 114 (or a cell phone, tablet computer, etc.). A network connection between the parties may be established and supported by an organization or commercial service that provides computer services and software for use in telecommunications and/or VOIP, such as SKYPE®. Additionally or alternatively, the correctional facility and/or the destination may use video-conferencing equipment compatible with ITU H.323, H.320, H.264, and/or V.80, or other suitable standards.

In addition to providing certain visitation and communication operations, communication processing system 101 may, in, such as for example, a correctional facility embodiment, attempt to ensure that an inmate's calls, video conferences, online chats, etc. are performed only with non-residents whose identities, devices, email addresses, phone numbers, etc. are listed in that inmate's Pre-Approved Contact (PAC) list. Each inmate's PAC list may be stored, for example, in database 115 maintained by an Administration and Management System (AMS) 116. In addition to PAC list(s), AMS 116 may also store inmate or resident profile data (RPD), as well as visitation rules applicable to each inmate. As an example, in the context of a correctional facility, database 115 may include information such as balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

In some embodiments, database 115 may include biometric signatures of inmates (e.g., voice, facial, iris, fingerprint, etc.) and/or of other facility personnel (e.g., correctional officers, staff, etc.). In addition, database 115 may include one or more covert surveillance rules including, for example, the times and dates of scheduled covert monitoring and/or recording, identity of inmates that are the target of ongoing investigations, a maximum threshold number of inmates allowed to be in different areas within the facility at a given time, etc.

In scenarios where communication system 101 is located within the facility, it may have direct access to AMS 116. In other embodiments, however, communication system 101 may be located remotely with respect to the controlled-environment facility (or it may have certain elements disposed within the facility and other elements disposed remotely with respect to the facility) and access to AMS 116 may be obtained via a computer network such as, for example network 110.

Figure 2:
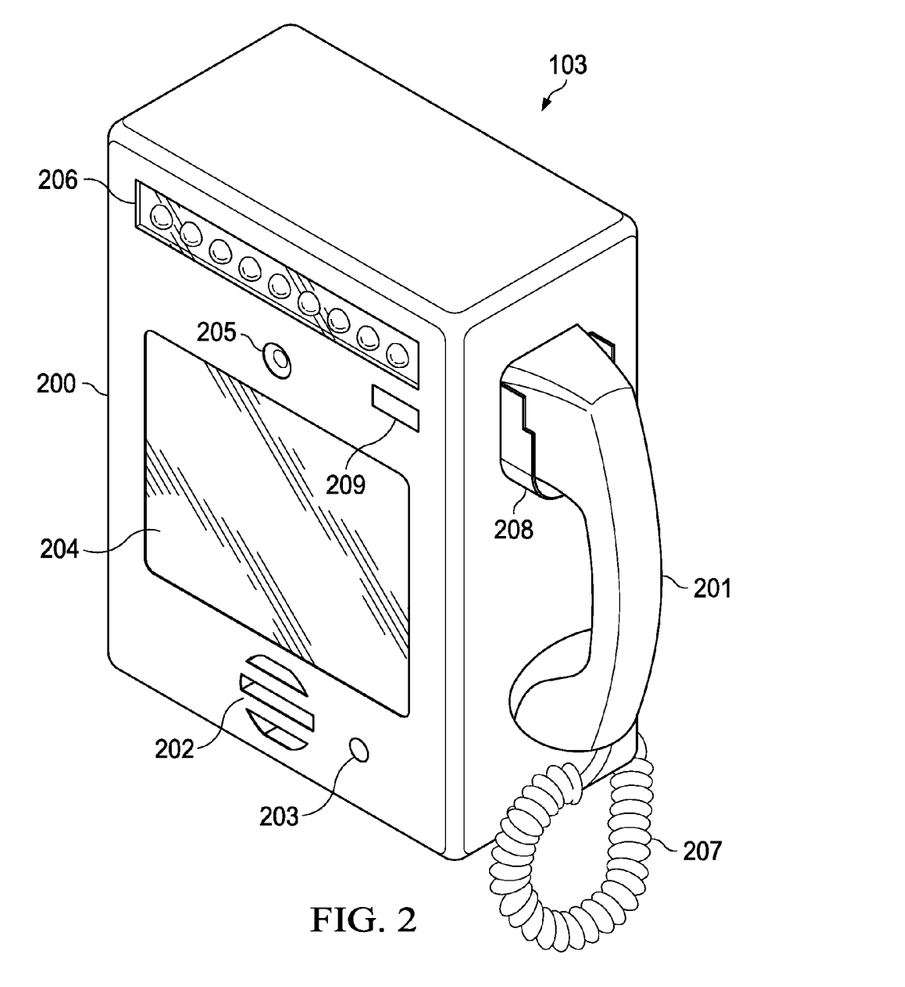
FIG. 2 is a diagrammatic illustration of an example of an intelligent facility communication and/or media device, according to some embodiments of the present systems and methods.

FIG. 2 is a diagram of IFD 103, a controlled-environment facility video visitation device. In some embodiments, device 103 may be implemented as a computer-based system such as described in connection with FIG. 7. Also, in some implementations, IFD 103 may be located in a pod, which is a separate and self-contained housing unit within a correctional facility designed to hold a number of inmates (e.g., ~12 to 50 prisoners). A small number of prison officers (e.g., ~2 or 3), and sometimes a single officer or other facility personnel, supervise each pod. Each pod may contain tiers of cells arranged around a central control station or desk from which a single officer can monitor all the cells and the entire pod, control cell doors, and communicate with the rest of the inmates. Additionally or alternatively, IFD 103 may be disposed in a visitation area of the correctional facility. In other embodiments, IFD 103 may be disposed outside of the correctional facility or within a sleeping area, such as in a cell.

As illustrated, device 103 includes display 204, camera 205, and handset 201 coupled to device 103 via wire 207. Display 204 may be any suitable electronic display such as, for example, a Liquid Crystal Display (LCD), a touchscreen display (e.g., resistive, capacitive, etc.), or the like, whereas camera 205 may be a suitable imaging device such as, for instance, a video camera or webcam equipped with Charge-Coupled Devices (CCDs), Complementary Metal-Oxide-Semiconductor (CMOS) active pixel sensors, etc. Camera 205 may be infrared sensitive in some embodiments. Some IFDs may employ visible light sources for enabling capture of conventional images and/or video, such as in the manner discussed in greater detail below. Embodiments of such IFDs may employ this same light module 206, such as under software control, to selectively control the light module to emit visible light, in accordance with embodiments of the present systems and methods. Handset 201 may be similar to a traditional telephone handset including an earpiece portion (with a loudspeaker), a handle portion, and a mouthpiece portion (with a microphone).

During a video visitation session, IFD 103 may be configured to capture a video image of an inmate to be transmitted to a non-resident using camera 205, and to display a video image of the non-resident to the inmate using display 204. An indicator, such as indictor light 209 may light to indicate that the resident's image is being captured. Additionally or alternatively screen 204 may display an indication that the user's image is being recorded or otherwise captured. IFD 103 may also be configured to capture an audio signal from the inmate to be transmitted to the non-resident using the mouthpiece portion of handset 201, and to provide an audio signal from the non-resident to the inmate using the earpiece portion of handset 201. Additionally or alternatively, audio received from the non-resident may be reproduced via loudspeaker 202, and audio provided by the inmate may be captured via microphone 203. In some embodiments, handset holder or holster 208 may be configured to allow a user to securely rest handset 201 against device 103 (e.g., in the "on hook" position) when device 103 is not in use. Furthermore, handset holder 208 may include a mechanical or electromechanical switch or sensor (not shown) that senses when handset 201 is not resting against it (e.g. in the "off hook" position).

It should be noted that, outside of correctional facilities, IFD 103 may assume the form of any computer, tablet computer, smart phone, etc., or any other consumer device or appliance with videoconferencing capabilities. Meanwhile, in the context of correctional facilities, IFD 103 may include one or more tampering/impact resistant or hardened elements configured to protect them from vandalism or otherwise destructive acts. For example, one or more of elements 202 through 206 may be protected by a transparent plastic or thermoplastic (e.g., Plexiglas, etc.) material.

IRDs 104, a personal resident communication and/or media device, may be tablet computing devices, smartphones, media players, or the like adapted and/or approved for use by residents of the controlled-environment facility (within the controlled-environment facility). Each IRD 104 may be particularly adapted for use in a controlled-environment. For example, such an IRD (or IID) may have a specially adapted operating system and/or may be "stripped-down," particularly from the standpoint of what apps and/or hardware are provided or allowed on IRD 104, and/or connectivity afforded such an IRD. For example, such an IRD may employ an operating system kernel that is built for use in such an IRD in a controlled-environment facility. As a further example, the IRD may be adapted to only connect to a network provided by the controlled-environment facility, and/or in only certain locations, within the controlled-environment facility, such as may be controlled by availability of Wi-Fi access, or the like, only being available in certain areas. That is, for example, where streaming and/or downloading may be compartmentalized, leveraging the structure of the controlled-environment facility, for example, limiting the availability of a Wi-Fi signal, providing the stream through the placement of wireless access points, antenna directionality of such wireless access points, and/or the like. Further, the IRD may allow access to apps or content only upon application of security measures, by the IRD. Such security measures may include determining, by the IRD, DNS spoofing, DNS redirection, use of proxy servers for privacy and security, biometric validation, password validation, and/or the like. Also, in accordance with embodiments of the present systems and methods, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on IRDs might include apps of particular interest to residents of the controlled-environment facility. For example, IRDs provided to inmates of correctional facilities, might include apps that may be of particular use to an inmate, in general, such as access to a legal research service, or of more specific interest, such as providing an inmate nearing release, access to employment searching apps or the like. Hence, such inmate IRDs may be used to help soon to be released inmates transition. For example, the IRD may be used to communicate with a future employer, or the like. As such, IRDs may be sponsored, or otherwise subsidized by organizations or companies, assisting with the transition of inmates into society.

Figure 3:
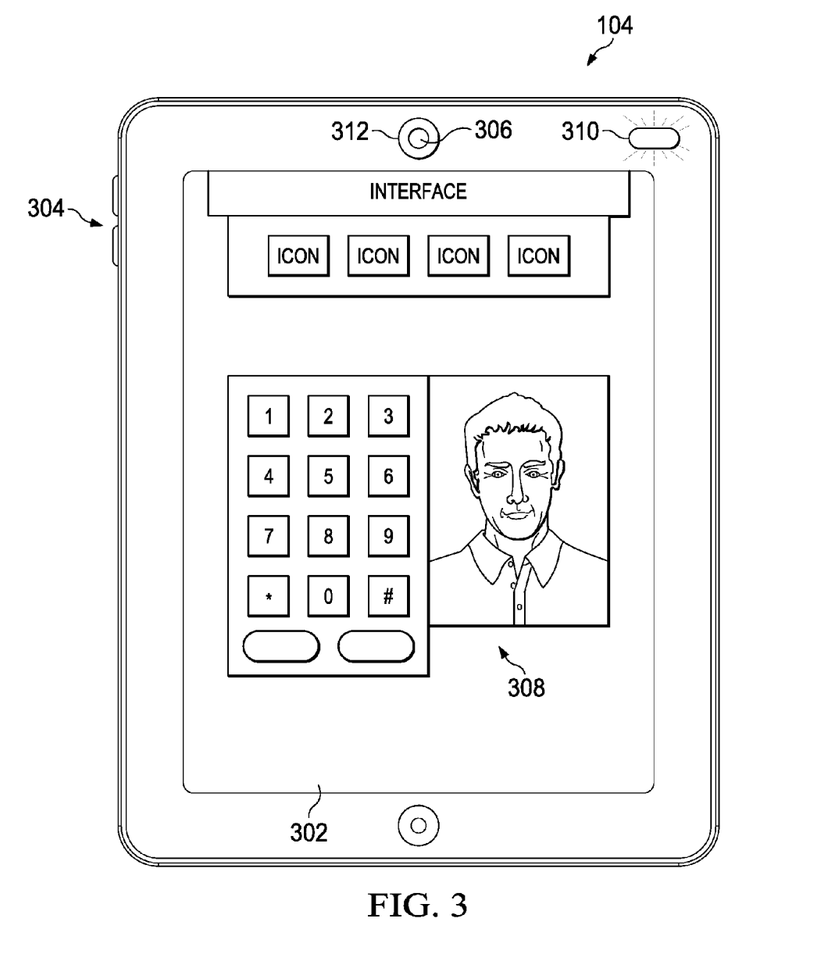
FIG. 3 is a diagrammatic illustration of an example intelligent resident communication and/or media device, according to some embodiments of the present systems and methods.

FIG. 3 is a diagrammatic illustration of example intelligent personal resident communication and/or media device 104, according to some embodiments of the present systems and methods. IRD 104 includes screen 302 one or more hardware buttons 304 and a camera 306. A resident making a phone call on device 104 and talking to the called party, using open phone app 308 would appreciate that their image is being captured. Camera 306 may be capable of capturing an infrared image of a user. Lighting of a subject during a video call may be accomplished using visible light from light 310. However, in some embodiments, this light may be tunable to emit (nonvisible) infrared light and/or may include one or more infrared elements, such as infrared LEDs. Alternatively or additionally, a second light source 312 (such as illustrated around camera 306) may provide visible and/or infrared lighting. As will be appreciated, IFD 103, IRD 104, or other similar devices have video conferencing capabilities, or the like, to enable a party to participate in video communication sessions with other call parties, such as non-residents of the controlled-environment facility, via video communication, secure online chat, etc.

Figure 4:
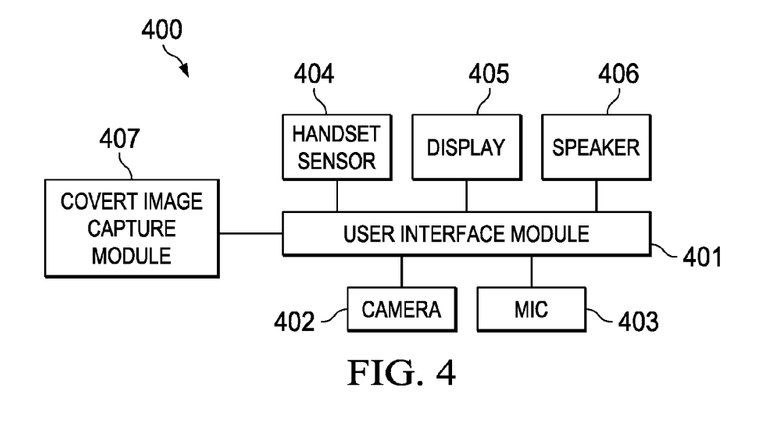
FIG. 4 is a block diagram of an example of intelligent facility communication and/or media device functionality and/or software, according to some embodiments of the present systems and methods.

FIG. 4 is a block diagram of an example of communication device software 400. In some embodiments, software 400 may be executed, at least in part, by IFD 103 shown in FIG. 2 and/or IRD 104 shown in FIG. 3. As illustrated, software 400 may include resident interface module 401 (configured to allow a user to interact with software 400, controlled-environment facility communications processing system 101, and/or the like), camera/video capture interface module 402, microphone/audio capture interface module 403, handset sensor module 404, display module 405 and loudspeaker module 406. Other modules not shown in FIG. 4, for sake of brevity may include, but are not limited to, a communications engine, an AMS interface (configured to allow software 400 to access information stored in database 115), and/or the like.

In various embodiments, resident interface module 401 may be configured to facilitate interaction with the device, such as receipt of input to authenticate the identity of an inmate and exchange one or more messages with communication system 101, and/or devices 112 or 113 over network 110. In accordance with embodiments of the present systems and methods resident interface module 401 may utilize camera/video capture interface module 402 to capture images and/or video of a device user.

Covert image capture module 407 may be configured to perform one or more operations for covertly capturing user images and/or video of the user as described in detail in connection with example implementations 500 and/or 600 shown in FIGS. 5 and 6, discussed below. Covert image capture module 407 may, in some cases, be implemented, at least in part, in device 103 or 104. Additionally or alternatively, covert image capture module 407 may be implemented, at least in part, by communications system 101, AMS 116, and/or may otherwise be centrally deployed, or distributed.

In certain embodiments, each of the different components of communication device software 400 may be implemented in software, hardware or a suitable combination thereof, in an integrated fashion (e.g., on a single server or computer system) or in a distributed fashion (e.g., via a number of distinct systems configured to communicate with one another via a network). Additionally or alternatively, the operation of visitation software 400 may be partitioned into components in a different fashion than illustrated in FIG. 4.

Referring back to FIG. 1, IFDs 103, IRDs 104 (as well as other communication devices 102) have traditionally been used only for facilitating inmate communications. Hence, in accordance with embodiments of the present systems and methods, controlled-environment facility resident communication and/or media devices, such as IFDs 103 and/or IRDs 104 may, as noted, be disposed within a controlled-environment facility, and may include at least one processor and a memory coupled to the processor(s). However, in accordance with embodiments of the present systems and methods, program instructions associated therewith are executable by the processor(s) to enable one resident task, involving a resident of the controlled-environment facility. Therewith, the controlled-environment facility resident communication and/or media device 103 or 104 is configured to provide a visual indication to the resident that an image and/or video is being taken, or otherwise captured, during this one task, such as by device camera 205 or 306, respectively. Since such notice is given that this image is being captured, it is referred to herein as an "overtly" or "openly" captured image or video, and may be used as a reference image or video, record image or video, archive image or video, or the like. In accordance with embodiments of the present systems and methods, the one task referenced above may be creation of an account, or the like. In accordance with such embodiments the controlled-environment facility resident communication and/or media device 103 or 104 may be configured to provide for creation and/or acceptance of account login credentials, and may associate, or at least facilitate association of, the openly captured image with the account and/or login credentials, etc. In accordance with some embodiments of the present systems and methods, facility personnel may be enabled, such as via an interface provided by controlled-environment facility communication processing system 101, to alternatively capture this overt image.

Controlled-environment facility resident communication and/or media devices 103 or 104 are also configured, in accordance with various embodiments of the present systems and methods to capture a covert image and/or video of a user. This covert image may be captured while the subject device is in use for another task, without providing any visual indication to the user that the covert image is being captured. In accordance with various embodiments of the present systems and methods this other task may take place after, or before, the "one" task mentioned above. Further this other task may be entry of previously created or accepted credentials, some sort of acknowledgement by the user, such as an acknowledgement of certain terms and conditions, or an acknowledgement that a certain task has been completed, or the like. An entry of previously created or accepted credentials, may be a login or the like, in which case the covert image and/or video may only be captured as a result of a predetermined number of failed login attempts, or the like. Additionally or alternatively, facility personnel may be enabled, such as via an interface provided by controlled-environment facility communication processing system 101, to alternatively capture this covert image and/or additionally capture further covert images.

Prior to capturing the covert image, controlled-environment facility resident communication and/or media device 103 or 104 may detect whether a face is present in a field of view of camera 205 or 306. In accordance with such embodiments of the present systems and methods, entry of credentials, acceptance of an acknowledgement, or (any further or) other action by the user may be halted (i.e. refused) by the device until a face is present in a field of view of camera 205/306 of device 103/104, so that the covert image can be captured. If a face does not become available for the covert image capture, the entry of credentials, acceptance of an acknowledgement, or any further action by the user may be terminated, without completion.

Hence, embodiments of the present systems and methods may make use of "face detection" processes, and/or further or various other embodiments may make use of "facial recognition" processes. Face detection is a computer technology that identifies human faces in digital images. Face detection can be regarded as a specific case of object-class detection. In object-class detection, the task is to find the locations and sizes of all objects in an image that belong to a given class. Face detection algorithms focus on the detection of frontal human faces. Face detection is used in biometrics, often as a part of, or together with, a facial recognition system. Hence, face detection may be used to detect human faces, which might then be used for recognizing a particular face in a facial recognition process. However, such face detection may be used alone, without the use of facial recognition, in fields such as video surveillance, human computer interface, image database management, and/or in accordance with various embodiments of the present systems and methods. Face detection may be a fast, less computational-intensive process, which may be performed by a small local computer system, without the need to necessarily access databases, more powerful computational resources, or the like, which may be necessary for facial recognition.

To wit, a feature detection process may be performed, with a processor, on an image, to verify that images of features of a corporeal human face are present in the image to thereby determine whether an image of a corporeal human face is present in the captured image. This feature detection process may utilize three-dimensional (3D) feature detection process. In contrast, further embodiments may include preforming a facial recognition process on a captured image, following performance of the feature detection process and/or in response to a determination that an image of a corporeal human face is present in the captured image, to identify the user and/or to confirm an identity of the user.

Figure 5:
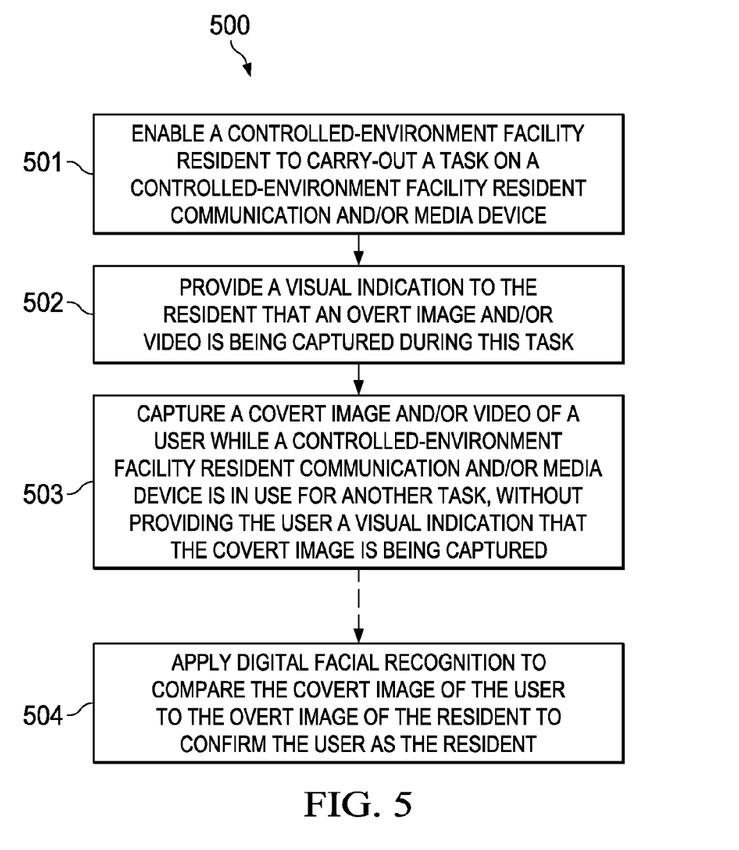
FIG. 5 is a flowchart of an example implementation for overt and covert capture of images of controlled-environment facility residents using an intelligent controlled-environment facility resident communications and/or media device, according to some implementations.

FIG. 5 is a flowchart of example implementation 500 for overt and covert capture of images of controlled-environment facility residents using an intelligent controlled-environment facility resident communications and/or media device (103 or 104), according to some implementations. Therein, a controlled-environment facility resident communication and/or media device (103 or 104) may enable a controlled-environment facility resident to carry-out tasks on the controlled-environment facility resident communication and/or media device, at 501, such as via a user interface. As noted, this controlled-environment facility resident communication and/or media device may be a video visitation device, such as IFD 103 or a personal resident communication and/or media device such as IRD/IID 104, discussed above. The aforementioned "one" task may, in accordance with embodiments of the present systems and methods, be creation of an account, or the like, and hence may include creation and/or acceptance of account login credentials and association of the openly captured image with the account and/or login credentials.

At 502, the controlled-environment facility resident communication and/or media device (103 or 104), may provide a visual indication, to the resident, that an overt image, such as reference image, record image, archive image or the like and/or a similar video recording of the resident is being taken, or otherwise captured, during one task, by a device camera (205 or 306). In accordance with some implementations of the present systems and methods, facility personnel may be enabled in accordance with steps 501 and/or 502, such as via an interface provided by the controlled-environment facility communication processing system (101), to capture this overt image.

Conversely, at 503 a covert image and/or video of a user of the same or different controlled-environment facility resident communication and/or media device (103 or 104) may be captured by a device camera (205 or 306), while this controlled-environment facility resident communication and/or media device is in use for another task. The image captured at 503 is captured without providing the user the same or other visual indication that this covert image is being captured. This other task may take place before or after the "one" task of 501 and 502. This other task may be entry of the aforementioned credentials and/or acceptance of some sort of acknowledgement by the resident, such as discussed above. In which case, the covert image and/or video may be associated with the credentials, as entered, at that time, and/or with the acknowledgement. Additionally or alternatively, where the other task is such a login, or the like, the covert image and/or video may only be captured at 503 as a result of a number of failed login attempts, such as, by way of example three failed login attempts, or the like. Additionally or alternatively, facility personnel may be enabled, such as via the interface provided by the controlled-environment facility communication processing system (101), to alternatively capture this covert image and/or additionally capture further covert images, at 503.

Optionally, digital facial recognition may be applied at 504 to compare the covert image of the user captured at 503 to the openly captured image of the resident from 502, to confirm the user at 503 as the resident from 501 and 502.

Additionally or alternatively the task, at 501 and 502 may be, or may include, creation of a resident electronic communications account and the other task at 503 may be sending an electronic communication using the electronic communications account. Such an electronic communications account may be an email account, social media account, image or video sharing account, or the like. In accordance with such embodiments the overtly captured image may be employed in such electronic communications and the resident may be enabled to supplement the image in the electronic communication such as in a novelty manner, consistent with a theme or holiday.

Figure 6:
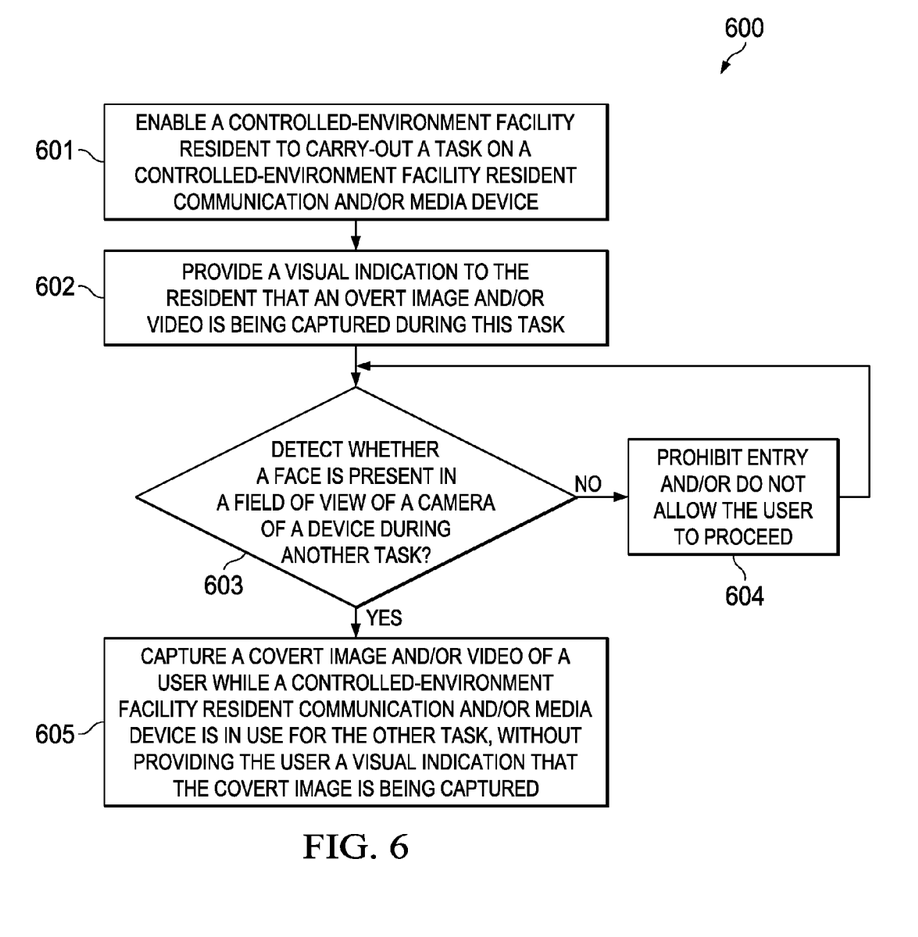
FIG. 6 is a flowchart of another example implementation of overt and covert capture of images of controlled-environment facility residents using an intelligent controlled-environment facility resident communications and/or media device, according to some implementations.

FIG. 6 is a flowchart of other (more detailed) example implementation 600 for overt and covert capture of images of controlled-environment facility residents using an intelligent controlled-environment facility resident communications and/or media device, according to some implementations. Therein, a controlled-environment facility resident communication and/or media device (103 or 104) may enable a controlled-environment facility resident to carry-out tasks on the controlled-environment facility resident communication and/or media device at 601, such as via a user interface.

At 602, the controlled-environment facility resident communication and/or media device (103 or 104), may provide a visual indication, to the resident, that an overt image, such as reference image, record image, archive image or the like, and/or a similar video recording, of the resident is being taken, or otherwise captured by a device camera (205 or 306), during one task. In accordance with some implementations of the present systems and methods, facility personnel may be enabled, such as via an interface provided by the controlled-environment facility communication processing system (101), to alternatively capture this overt image in accordance with steps 601 and 602.

The same or different controlled-environment facility resident communication and/or media device (103 or 104), may determine at 603 whether a face is present in a field of view of a camera (205 or 306) of the controlled-environment facility resident communication and/or media device while this controlled-environment facility resident communication and/or media device is in use for another task, after or before the "one" task mentioned above. At 604, this same or different controlled-environment facility resident communication and/or media device (103 or 104), may prohibit entry of credentials and/or acknowledgements, and/or otherwise not allow a user to proceed with the other task in response to a failure to detect whether a face is present in a field of view of the camera (205 or 306) of the controlled-environment facility resident communication and/or media device at 603. This refusal to allow entry of credentials and/or acknowledgements, and/or otherwise not allowing a user to proceed with the other task, may continue until it is determined (at 603) that a face is present in the field of view of the camera of the controlled-environment facility resident communication and/or media device.

Once it is determined at 603 that a face is present in the field of view of the camera (205 or 306) of the same or different controlled-environment facility resident communication and/or media device (103 or 104), a covert image and/or video of a user of the device may be captured at 605, as, or before, the other task is allowed to proceed. The image captured at 605 is also captured without providing the user the same or other visual indication that this covert image is being captured. Additionally or alternatively, facility personnel may be enabled, such as via the interface provided by the controlled-environment facility communication processing system (101), to alternatively capture this covert image and/or additionally capture further covert images, in accordance with step 605.

Figure 7:
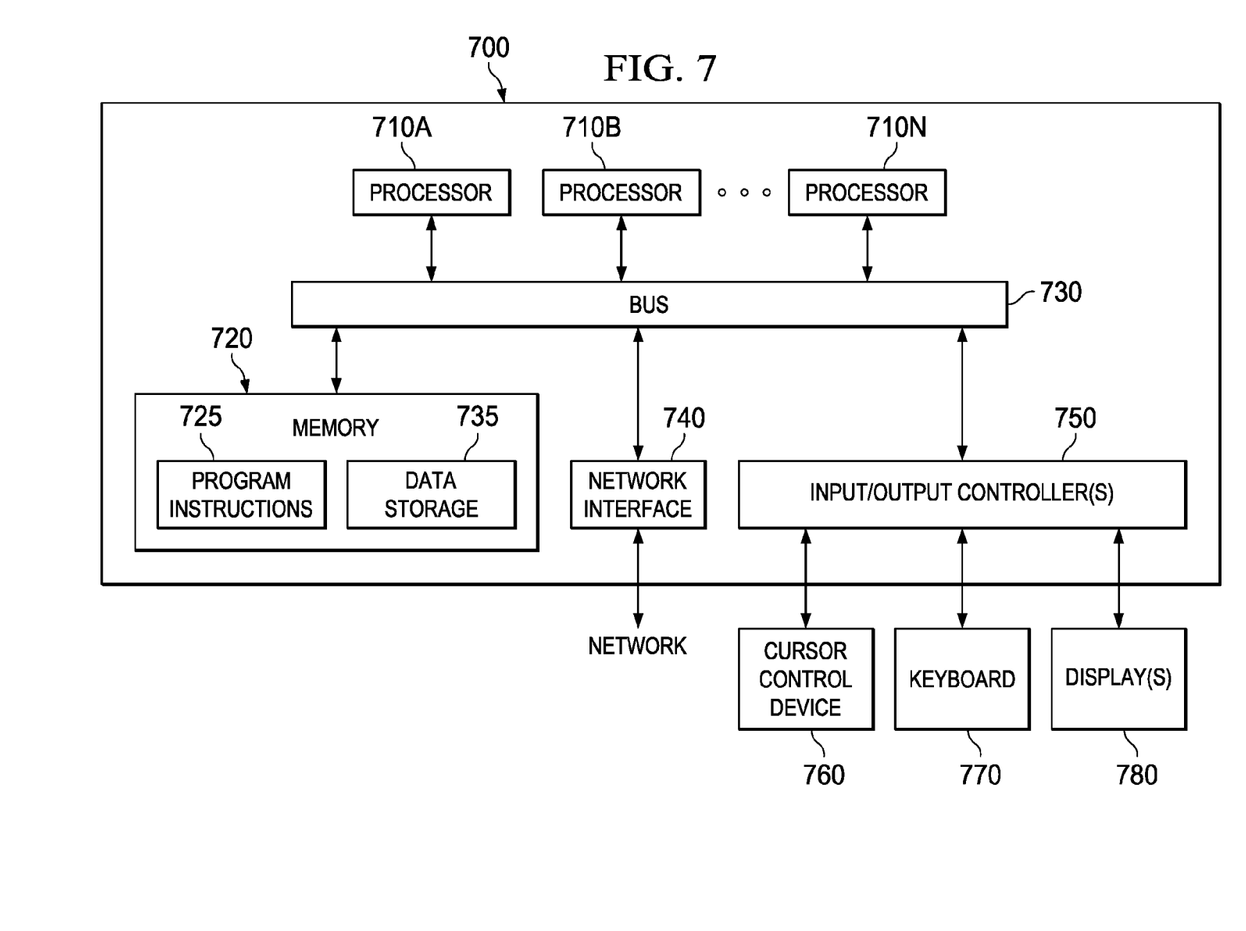
FIG. 7 is a block diagram of an example of a computer system configured to implement various systems and methods described herein according to some embodiments.

Embodiments of systems and methods for overtly and covertly capturing images of controlled-environment facility residents using intelligent controlled-environment facility resident communications and/or media devices, as described herein, may be implemented or executed by one or more computer systems. One such computer system is illustrated in FIG. 7. In various embodiments, computer system 700 may be a server, a mainframe computer system, a workstation, a network computer, a desktop computer, a laptop, or the like. For example, in some cases, blocks 101, 116, or the like, shown in FIG. 1 may include computer system 700. Moreover, communication devices 103, 104, 105, 112, and 113 may be implemented, in whole or part, as computer system 700. As explained above, in different embodiments these various computer systems may be configured to communicate with each other in any suitable way, such as, for example, via network 110.

As illustrated, computer system 700 includes one or more processors 710A-N coupled to a system memory 720 via bus 730. Computer system 700 further includes a network interface 740 coupled to bus 730, and one or more I/O controllers 750, which in turn are coupled to peripheral devices such as cursor control device 760, keyboard 770, display(s) 780, etc. Each of I/O devices 760-780 may be capable of communicating with I/O controllers 750, for example, via a wired connection (e.g., serial port, Universal Serial Bus port) or wireless connection (e.g., Wi-Fi, Bluetooth, Near Field Communications Link, etc.) Other devices may include, for example, surveillance cameras, microphones, antennas/wireless transducers, phone detection modules, etc.

In various embodiments, computer system 700 may be a single-processor system including one processor 710A, or a multi-processor system including two or more processors 710A-N (e.g., two, four, eight, or another suitable number). Processors 710 may be any processor capable of executing program instructions. For example, in various embodiments, processors 710 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 710 may commonly, but not necessarily, implement the same ISA. Also, in some embodiments, at least one processor 710 may be a graphics processing unit (GPU) or other dedicated graphics-rendering device.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as those described herein may be stored within system memory 720 as program instructions 725 and data storage 735, respectively. In other embodiments, program instructions and/or data may be received, sent or stored upon different types of computer-accessible media or on similar media separate from system memory 720 or computer system 700.

Generally speaking, a computer-accessible medium may include any tangible or non-transitory storage media or memory media such as electronic, magnetic, or optical media—e.g., disk or CD/DVD-ROM coupled to computer system 700 via bus 730. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 730 may be configured to coordinate I/O traffic between processor 710, system memory 720, and any peripheral devices in the device, including network interface 740 or other peripheral interfaces, such as input/output devices 750. In some embodiments, bus 730 may perform any necessary protocol, timing or other data transformations to convert data signals from one component (e.g., system memory 720) into a format suitable for use by another component (e.g., processor 710). In some embodiments, bus 730 may include support for devices attached through various types of peripheral buses, such as a variant of the Peripheral Component Interconnect (PCI) bus standard or the Universal Serial Bus (USB) standard, for example. In some embodiments, the function of bus 730 may be split into two or more separate components, such as a northbridge chipset and a southbridge chipset, for example. In addition, in some embodiments some or all of the functionality of bus 730, such as an interface to system memory 720, may be incorporated directly into processor(s) 710A-N.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 750 may, in some embodiments, enable communications with one or more display terminals, keyboards, keypads, touchpads, scanning devices, voice or optical recognition devices, mobile devices, or any other devices suitable for entering or retrieving data by one or more computer system 700. Multiple I/O controllers 750 may be present in computer system 700 or may be distributed on various nodes of computer system 700. In some embodiments, I/O devices may be separate from computer system 700 and may interact with one or more nodes of computer system 700 through a wired or wireless connection, such as over network interface 740.

As shown in FIG. 7, memory 720 may include program instructions 725, configured to implement certain embodiments described herein, and data storage 735, comprising various data may be accessible by program instructions 725. In an embodiment, program instructions 725 may include software elements, which may be configured to effect operations. Program instructions 725 may be implemented in various embodiments using any desired programming language, scripting language, or combination of programming languages and/or scripting languages (e.g., C, C++, C#, Java™, JavaScript™, Perl, etc.). Data storage 735 may include data that may be used in these embodiments (e.g., recorded communications, profiles for different modes of operations, etc.). In other embodiments, other or different software elements and data may be included.

A person of ordinary skill in the art will appreciate that computer system 700 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various systems and methods illustrated in the figures and described herein represent example embodiments of systems and methods for covert monitoring and recording of audio and video in controlled-environment facilities. These techniques may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controlled-environment facility resident communication and/or media device disposed within a controlled-environment facility, device comprising:
    at least one processor; and
    a memory coupled to the at least one processor, the memory configured to store program instructions executable by the at least one processor to cause the controlled-environment facility resident communication and/or media device to:
        enable one resident task involving a resident of the controlled-environment facility, wherein the controlled-environment facility resident communication and/or media device is configured to provide a visual indication to the resident that an overt image and/or video is being captured during the task; and
        capture a covert image and/or video of a user of the controlled-environment facility resident communication and/or media device while the controlled-environment facility resident communication and/or media device is in use for another task, by the controlled-environment facility resident communication and/or media device, without providing the same or other visual indication to the user that the covert image is being captured.

2. The controlled-environment facility resident communication and/or media device of claim 1, wherein the one resident task is creation of a resident account, and the program instructions are further executable to cause the controlled-environment facility resident communication and/or media device to provide for creation and/or acceptance of account login credentials as part of the one resident task.

3. The controlled-environment facility resident communication and/or media device of claim 2 wherein the other task is entry of the credentials.

4. The controlled-environment facility resident communication and/or media device of claim 2 wherein the other task is an acknowledgement by the user.

5. The controlled-environment facility resident communication and/or media device of claim 1, wherein the other task is a login and the covert image and/or video is captured as a result of a predetermined number of failed login attempts.

6. The controlled-environment facility resident communication and/or media device of claim 1, wherein the program instructions are further executable to cause the controlled-environment facility resident communication and/or media device to detect whether a face is present in a field of view of a camera of the controlled-environment facility resident communication and/or media device, prior to capturing the covert image and/or video using the camera.

7. The controlled-environment facility resident communication and/or media device of claim 6 wherein the other task is entry of credentials and/or an acknowledgement by the user, and the program instructions are further executable to cause the controlled-environment facility resident communication and/or media device to prohibit entry of the credentials and/or acknowledgement in response to a failure to detect whether a face is present in the field of view of the camera of the controlled-environment facility resident communication and/or media device.

8. The controlled-environment facility resident communication and/or media device of claim 6 wherein the other task is entry of credentials and/or an acknowledgement by the user, and the program instructions are further executable to cause the controlled-environment facility resident communication and/or media device to prohibit entry of the credentials and/or acknowledgement until a face is present in the field of view of the camera of the controlled-environment facility resident communication and/or media device.

9. The controlled-environment facility resident communication and/or media device of claim 1, wherein the controlled-environment facility resident communication and/or media device is a video visitation device.

10. The controlled-environment facility resident communication and/or media device of claim 1, wherein the controlled-environment facility resident communication and/or media device is a personal resident communication and/or media device.

11. A method comprising:
    enabling, by a controlled-environment facility resident communication and/or media device, a controlled-environment facility resident to carry-out one task on the controlled-environment facility resident communication and/or media device;
    providing, by the controlled-environment facility resident communication and/or media device, a visual indication, to the resident, that an overt image and/or video is being captured during the one task; and
    capturing a covert image and/or video of a user while the controlled-environment facility resident communication and/or media device is in use for another task, without providing the user the same or other visual indication that the covert image is being captured.

12. The method of claim 11, wherein the one task is creation of an account and includes creation and/or acceptance of account login credentials and association of the overt image with the account and/or login credentials.

13. The method of claim 12, wherein the other task is entering of the credentials and the method further comprises associating the covert image and/or video with the credentials entered.

14. The method of claim 11 wherein the other task is an acknowledgement by the user.

15. The method of claim 11, further comprising applying digital facial recognition to compare the covert image of the user to the overt image of the resident to confirm the user as the resident.

16. The method of claim 11, further comprising detecting, by the controlled-environment facility resident communication and/or media device, whether a face is present in a field of view of a camera of the controlled-environment facility resident communication and/or media device, prior to capturing the covert image and/or video with the camera.

17. The method of claim 16 wherein the other task is entry of credentials and/or an acknowledgement by the user, and the method further comprises prohibiting entry of the credentials and/or acknowledgement in response to a failure to detect whether a face is present in the field of view of the camera of the controlled-environment facility resident communication and/or media device.

18. The method of claim 16 wherein the other task is entry of credentials and/or an acknowledgement by the user, and the method further comprises prohibiting entry of the credentials and/or acknowledgement until a face is present in the field of view of the camera of the controlled-environment facility resident communication and/or media device.

19. The method of claim 11, wherein the other task is a login and the covert image and/or video is captured as a result of a predetermined number of failed login attempts.

20. The method of claim 11, wherein the one task is creation of a resident electronic communications account and the other task is sending an electronic communication using the electronic communications account, and the method further comprises employing the overt image of the resident in the electronic communication.

21. The method of claim 20, further comprising enabling the resident to supplement the overt image of the resident in the electronic communication.

22. The method of claim 11, wherein the controlled-environment facility resident communication and/or media device is a video visitation device.

23. The method of claim 11, wherein the controlled-environment facility resident communication and/or media device is a personal resident communication and/or media device.

24. A tangible non-transitory computer-readable storage medium having program instructions stored thereon that, upon execution by a controlled-environment facility resident communication and/or media device, cause the controlled-environment facility resident communication and/or media device to:

enable a controlled-environment facility resident to carry-out creation of an account on the controlled-environment facility resident communication and/or media device, including creation and/or acceptance of account login credentials;

provide a visual indication to the resident that an overt image and/or video is being captured during the creation of the account;

associate the overt image with the account and/or login credentials;

capture a covert image and/or video of a user while the controlled-environment facility resident communication and/or media device is in use for entry of the credentials and/or an acknowledgment by the user, without providing the user the same or other visual indication that the covert image is being captured; and associate the covert image and/or video with the credentials entered and/or the acknowledgement.

* * * * *